United States Patent
Inugai et al.

(10) Patent No.: US 7,472,857 B2
(45) Date of Patent: Jan. 6, 2009

(54) TAPE CARTRIDGE, TAPE REEL DRIVING STRUCTURE, AND TAPE DRIVE

(75) Inventors: Yasuo Inugai, Osaka (JP); Hideyuki Tanaka, Osaka (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

(21) Appl. No.: 11/882,296

(22) Filed: Jul. 31, 2007

(65) Prior Publication Data

US 2008/0029632 A1 Feb. 7, 2008

(30) Foreign Application Priority Data

Aug. 2, 2006 (JP) .............................. 2006-210691

(51) Int. Cl.
*G11B 23/04* (2006.01)
(52) U.S. Cl. ...................... 242/340; 242/611
(58) Field of Classification Search ................. 242/338, 242/338.1, 340, 611, 611.1, 611.2; 360/83, 360/93, 96.3
See application file for complete search history.

(56) References Cited

U.S. PATENT DOCUMENTS

| | | | | |
|---|---|---|---|---|
| 3,934,839 A | * | 1/1976 | Serizawa | 360/93 |
| 4,133,497 A | * | 1/1979 | Rothlisberger | 242/340 |
| 4,234,140 A | * | 11/1980 | Van Nie et al. | 242/340 |
| 4,309,002 A | * | 1/1982 | Saitou et al. | 242/340 |
| 4,445,651 A | * | 5/1984 | Kimizuka et al. | 242/340 |
| 4,629,140 A | * | 12/1986 | LaCasse | 242/611.2 |
| 6,726,144 B2 | * | 4/2004 | Squires | 242/611.2 |
| 6,869,037 B2 | * | 3/2005 | Hiraguchi | 242/340 |
| 2003/0127555 A1 | * | 7/2003 | Squires | 242/611.2 |

FOREIGN PATENT DOCUMENTS

JP      2004-273014 A      9/2004

* cited by examiner

*Primary Examiner*—William A Rivera
(74) *Attorney, Agent, or Firm*—Birch, Stewart, Kolasch & Birch, LLP

(57) ABSTRACT

A tape cartridge in which an operation for engaging a reel hole of a tape reel with a drive shaft can be carried out smoothly, the tape reel can be rotationally driven in a state in which the centers of the drive shaft and the reel hole match, and reading/writing from/to recording tape can consistently be carried out in a stable manner. A drive shaft 13 of a tape drive comprises a fitting shaft 15 formed in a multi-sided cross-section shape and an engagement guide shaft 16 formed in an upwardly tapered shape. A drive shaft insertion hole 1c for the drive shaft 13 is provided in a lower wall of a housing 1. A reel hole 9 into which the drive shaft 13 is fitted is provided in a hub 5 of the tape reel 2. The reel hole 9 is formed in the same multi-sided cross-section shape as the fitting shaft 15, the vertical depth of the reel hole 9 being set so as to accept the fitting shaft 15 and the coupling guide shaft 16.

8 Claims, 6 Drawing Sheets

TAPE CARTRIDGE, TAPE REEL DRIVING STRUCTURE, AND TAPE DRIVE

BACKGROUND OF THE INVENTION

1. Field of the Invention

The present invention relates to a tape cartridge having an improved structure for driving a tape reel, a tape reel driving structure, and a tape drive that rotationally drives a tape reel of a tape cartridge.

2. Description of Related Art

Several types of reel driving structures exist wherein a tape reel in a tape cartridge is rotationally driven on a drive shaft of a tape drive in a state in which the tape reel is engaged and coupled with the drive shaft, thereby winding in or feeding out recording tape wound upon the tape reel. Two types of reel driving structures of this kind are known. The first is a type wherein a reel hole is provided within a boss of the tape reel and a drive shaft is fitted into the reel hole, as represented by audio and video tape cartridges (called a "peripheral face coupling type"). The second is a type wherein the end face of a drive shaft couples with the bottom surface of a boss of the tape reel, the two engaging via engaging teeth in gear form, as represented by a single-reel type tape cartridge (called an "end-face coupling type") (see patent reference 1: JP 2004-273014A (paragraph 0035, FIG. 3)).

According to the peripheral face coupling type reel driving structure, the drive shaft is fitted into the reel hole, and thus a rotational force of the drive shaft can be transmitted reliably. However, clearance is allocated between the drive shaft and the reel hole in an amount sufficient for performing the operation of engaging the drive shaft with the reel hole to be performed in a smooth manner. Accordingly, there is a problem that it is easy for the center of the tape reel and drive shaft to become offset in the radial direction while being driven, and furthermore, a delay in operation equal to the amount of clearance arises when repeatedly starting and stopping the driving process. In the state in which the center is offset as mentioned here, it is not possible to avoid a variance in the speed of feed-out and take-up of recording tape during a revolution of the tape reel, which can easily result in variance in the tape forwarding speed within the tape drive, miswinding when taking up tape, and so on.

According to the end-face coupling type reel driving structure, the end face of the drive shaft is caught by the bottom wall of the tape reel boss, and the two are engaged via engaging teeth in gear form; therefore, unless all engaging teeth are in a properly interlocked state, the tape reel cannot be horizontally supported by the drive shaft. If the tape reel is rotated while the center axis of the reel is in this kind of tilted state, the reel flange will rise and fall during rotation; accordingly, it is impossible to prevent the path of movement of the recording tape from shifting up and down. Therefore, the tracking operation of a read/write head in the tape drive is delayed, or tracking is rendered impossible, when tracing signal tracks recorded onto the recording tape; as a result, reading/writing of the recorded signal cannot be carried out in a stable manner. Reading/writing of the recorded signal in a stable manner is particularly impossible in the case where the recording density of the recording tape is high and the recorded signal is read/written at high speed. There are also situations where miswinding occurs when taking up the recording tape into the tape reel, resulting in the tape edge being marred.

With the tape cartridge according to patent reference 1, a magnet is disposed on the end face of the drive shaft, and an iron-based adhesive plate is disposed on the bottom wall of the tape reel boss, making it possible for the top face of the drive shaft and the bottom wall of the tape reel to tightly adhere to one another. However, there is a problem that as long as all coupling teeth are not properly interlocked with one another, it is impossible to prevent the tape reel from tilting, and impossible to horizontally support the tape reel with the drive shaft in a stable manner, even if the drive shaft and tape reel are tightly coupled through the magnetic effect arising between the magnet and the adhesive plate.

SUMMARY OF THE INVENTION

Therefore, with the foregoing in mind, it is an object of the present invention to provide a tape cartridge, a tape reel driving structure, and a tape drive wherein an operation for engaging a reel hole of a tape reel with a drive shaft can be carried out smoothly while preventing the center axis of the tape reel from being offset in the radial direction or tilting while the tape reel and drive shaft are in an engaged state; reading/writing of a signal from/to recording tape can consistently be carried out in a stable manner; and furthermore, the recording tape can consistently be properly taken up in the tape reel without miswinds, whereby marring of the tape edge is eliminated. A further object of the present invention is to provide a tape cartridge, a tape reel driving structure, and a tape drive wherein a recorded signal can consistently be read from/written to the recording tape in a stable manner even in the case where the recording density of the recording tape is high and the recorded signal is read/written at high speed.

A tape cartridge according to the present invention is applicable in a tape drive in which a drive shaft comprises a fitting shaft formed in a multi-sided cross-section shape and an engagement guide shaft formed in an upwardly tapered shape continuing on top of the fitting shaft. A drive shaft insertion hole for the drive shaft is provided in a lower wall of a housing, the tape cartridge being configured of the housing. A reel hole into which the drive shaft is fitted and which inherits rotational force therefrom is formed in a hub of a tape reel contained within the housing in a state facing the drive shaft insertion hole. The reel hole is formed in the same multi-sided cross-section shape as the fitting shaft, and a vertical depth of the reel hole is set so as to accept the fitting shaft and the engagement guide shaft.

In tape reel driving structure according to the present invention, it is assumed that the tape reel contained within the housing is rotationally driven by the drive shaft of the tape drive. A reel hole into which the drive shaft is fitted is formed in the hub of the tape reel in a state facing the drive shaft insertion hole, the drive shaft insertion hole being provided in a lower wall of the housing. The drive shaft comprises a fitting shaft formed in a multi-sided cross-section shape and an engagement guide shaft formed in an upwardly tapered shape continuing on top of the fitting shaft. The reel hole is formed in the same multi-sided cross-section shape as the fitting shaft, and the vertical depth of the reel hole is set so as to accept the fitting shaft and the engagement guide shaft.

A tape drive according to the present invention comprises the drive shaft for rotationally driving the tape reel contained within the housing. A reel hole is formed in the hub of the tape reel in a state facing the drive shaft insertion hole, the drive shaft insertion hole being provided in a lower wall of the housing. The drive shaft comprises a fitting shaft formed in a multi-sided cross-section shape and an engagement guide shaft formed in an upwardly tapered shape continuing on top of the fitting shaft, the fitting shaft and engagement guide shaft fitting inside the reel hole.

DETAILED DESCRIPTION OF THE INVENTION

Figure 1:
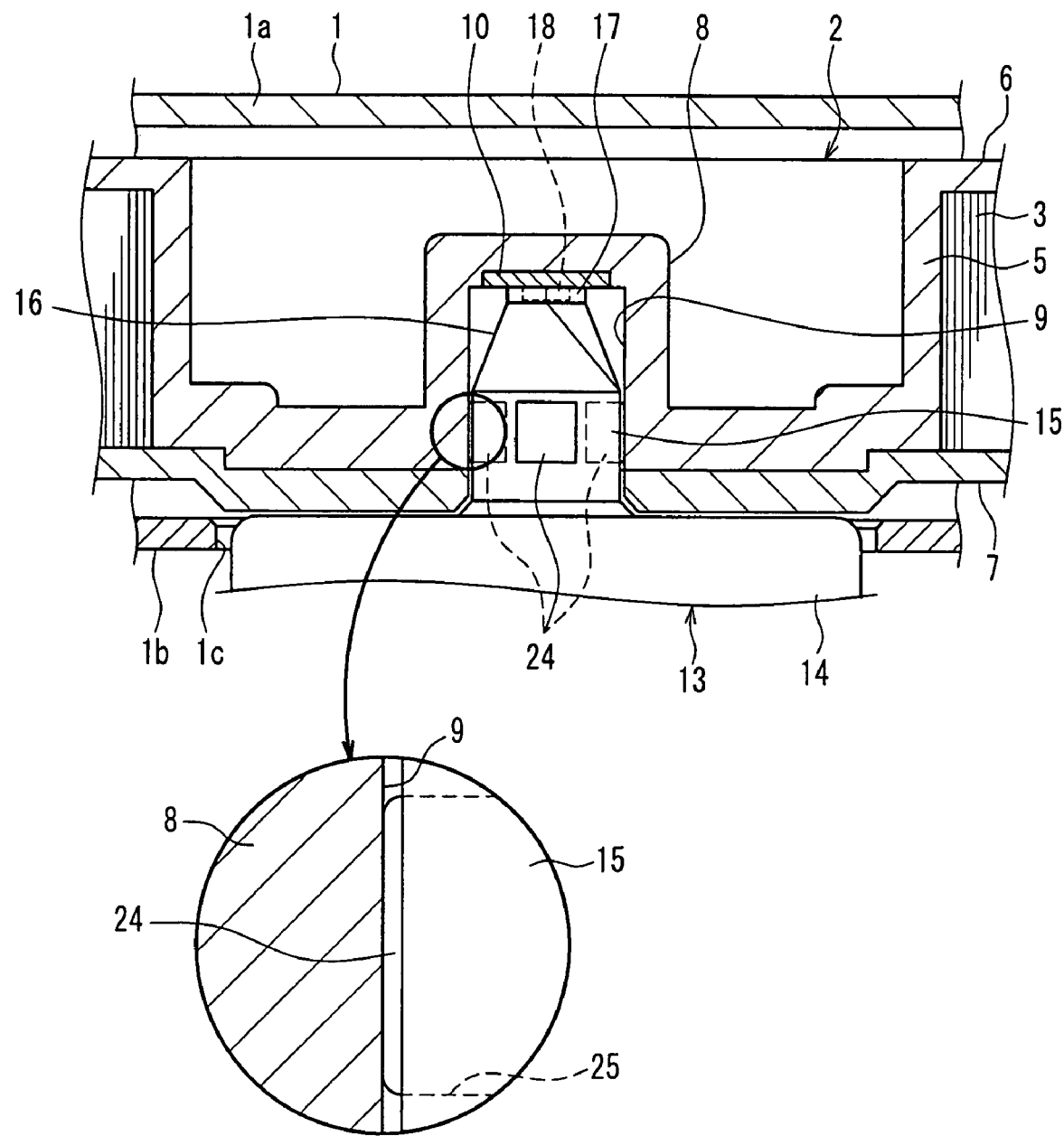
FIG. 1 is a cross-sectional view of a driving structure of a tape reel.

According to the present invention, a reel hole, into which a drive shaft of a tape drive is fitted, is formed in a hub of a tape reel, so that the drive shaft rotationally drives the tape reel. Moreover, the drive shaft is configured of a multi-sided cross-section shaped fitting shaft and an upwardly tapered engagement guide shaft and the like; the reel hole has a same multi-sided cross-section shape as the fitting shaft, and the vertical depth of the reel hole is set so as to accept the fitting shaft and the engagement guide shaft.

When a tape cartridge configured as described above is loaded into a tape drive, the drive shaft engages with the reel hole via a drive shaft insertion hole by relatively bringing the tape reel relatively closer while rotating the drive shaft. At this time, the upwardly tapered engagement guide shaft enters the reel hole first, thereby correcting offset of the center of the tape reel and the drive shaft. Furthermore, when the multi-sided cross-section shapes of the reel hole and the fitting shaft line up with one another, the fitting shaft is fitted into the reel hole, and the tilt of the center axis of the tape reel is corrected.

Therefore, according to the present invention, the operation of engaging the reel hole of the tape reel with the drive shaft can be carried out smoothly, and it is possible to properly match the center axis of the tape reel and the drive shaft in the state in which and they engaged with one another. As a result, reading/writing of a signal from/to recording tape can be consistently carried out in a stable state, and furthermore, the recording tape can consistently be properly taken up in the tape reel without miswinds, whereby marring of the tape edge is eliminated.

It is preferable that the cross-section of the engagement guide shaft is formed in a shape analogous to the cross-section of the fitting shaft and the engagement guide shaft is formed so that the entire engagement guide shaft twists around the axial center of the drive shaft. With this configuration, when ridge lines of the coupling guide shaft contact the opening of the reel hole and correct the offset of the center of the tape reel, the distance of relative movement between the ridge lines and the opening of the reel hole is lengthened by the amount by which the ridge lines are twisted. For this reason, the tape reel can be correctively moved even more smoothly, the corrective movement being performed gradually, without the tape reel being over-corrected, as compared to a case in which the engagement guide shaft 16 is formed in a simple straight upwardly tapered shape.

It is preferable that plural aligners are disposed within the drive shaft, the aligners absorbing clearance between the drive shaft and the reel hole. The aligners are supported by the drive shaft so as to be positionally changeable between a standby position, in which the aligners retract inwardly into the drive shaft, and an operative position, in which the aligners extend outwardly beyond the outer surface of the drive shaft and come into tight contact with the inner surface of the reel hole. An operating mechanism for switching the aligners between the standby position and the operative position is provided in the drive shaft.

With this configuration, the center of the tape reel and the drive shaft can be more correctly matched. Accordingly, reading/writing a signal from/to the recording tape can be performed in a stable manner, and it is possible to provide a tape cartridge and a tape reel driving structure suited for a tape system in which the recording density of the recording tape is high and reading/writing of the recording signal is performed at high speed.

It is preferable that a magnet is provided on one surface of a vertical coupling interface between the tape reel and the drive shaft, and an iron-based adhesive plate is provided on the other vertical surface of the interface between the tape reel and the drive shaft. With this configuration, through the adhesive effect between the adhesive plate and the magnet, the tape reel can be prevented, with certainty, from lifting off of the drive shaft when the tape reel is being rotationally driven, and thus feeding out and taking up of the recording tape can consistently be performed properly.

Hereinafter, the present invention will be described by way of a working example with reference to the drawings.

WORKING EXAMPLE

Figure 2:
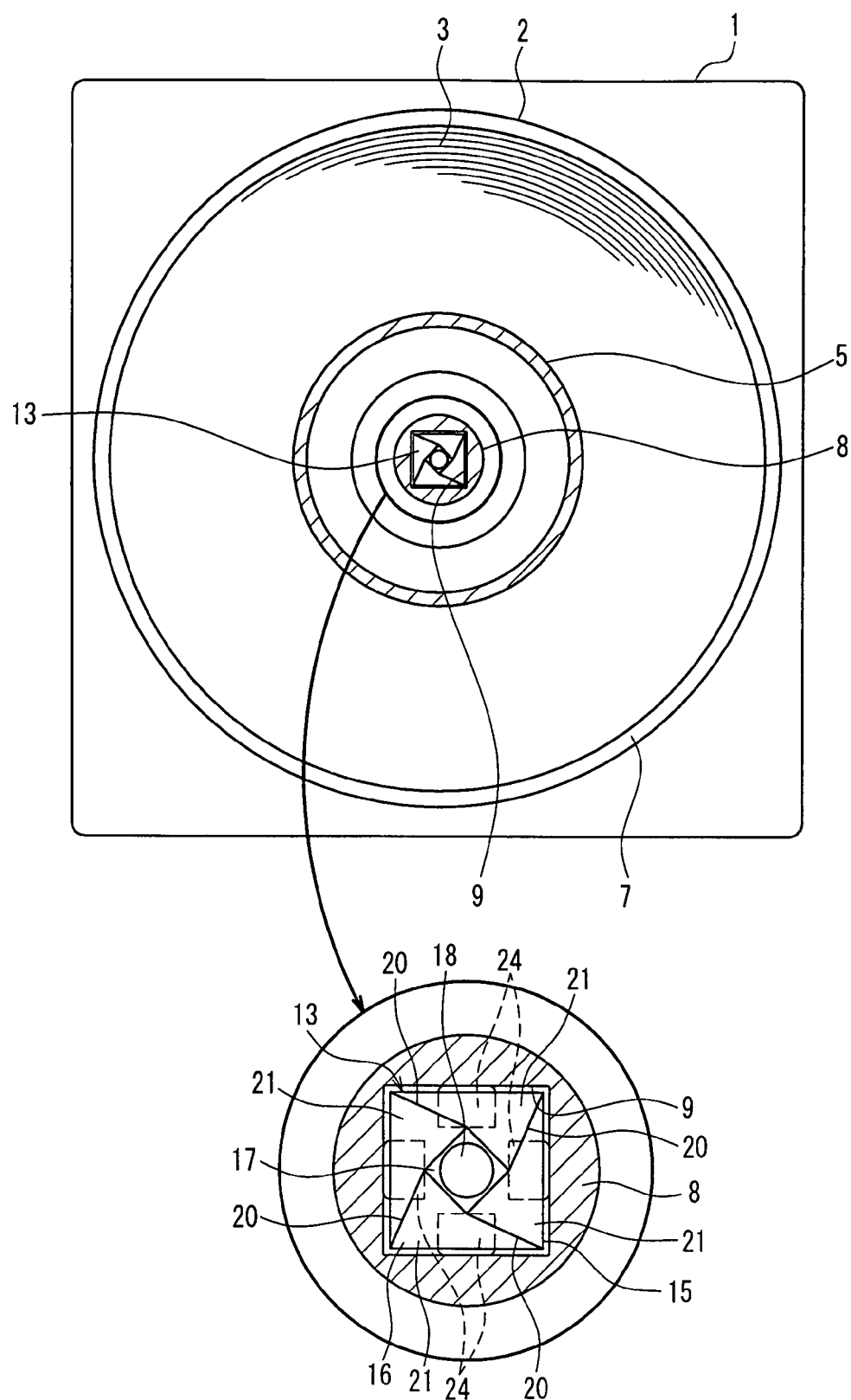
FIG. 2 is a plan view conceptually illustrating a tape cartridge.

FIGS. 1-5 illustrate a working example in which the present invention is applied in a single-reel type tape cartridge. In FIG. 2, a single tape reel 2 is enclosed within a housing 1, the tape cartridge being configured of the housing 1. The housing 1 has a quadrangular box shape and is formed by combining an upper casing 1a with a lower casing 1b, both of which are injection-molded articles, so that the upper casing 1a is in a stacked state upon the lower casing 1b. A drive shaft insertion hole 1c, used for the drive shaft, is provided in the lower wall of the lower casing 1b, and descriptions thereof shall be provided later.

Recording tape 3 is wound upon the tape reel 2, and a leader block (not shown) is fixed to the feed-out end thereof in order to draw out the recording tape 3. The leader block borders a loading opening provided on a front corner of the housing 1; by capturing the leader block by a chuck mechanism on the tape drive side and drawing the leader block out to the exterior of the housing 1, the recording tape 3 can be fed to the tape drive along a predetermined tape route.

The tape reel 2 in FIG. 1 is configured of an upper flange 6 in which a hub 5 for taking up the recording tape 3 is integrated, and a lower flange 7 that is fixed to the bottom surface of the hub 5. The top side of the hub 5 has an opening, and a coupling boss 8 is formed protruding in the center of the opening. The reel hole 9, into which the drive shaft 13, described later, is fitted, is formed from within the interior of the coupling boss 8 through the bottom surface of the lower flange 7. The horizontal cross-section of the reel hole 9 is formed in a square shape, the reel hole 9 being open on the side that faces the drive shaft insertion hole 1c, and an iron-based adhesive plate 10, to which a magnet can adhere, is embedded in a fixed state in the inner end surface of the reel hole 9.

The tape reel 2 is in a constant state of being pushed downward by a pressure-coil type spring (not shown) disposed between the internal floor of the hub 5 and the upper casing 1a. Furthermore, to prevent slack in the recording tape 3 when the tape is not in use, a reel locking mechanism (not shown) that locks the tape reel 2 in a non-rotatable state is provided between the inner part of the hub 5 and the upper casing 1a. This reel locking mechanism disengages when the drive shaft 13 and the tape reel 2 are in a coupled state.

Figure 3:
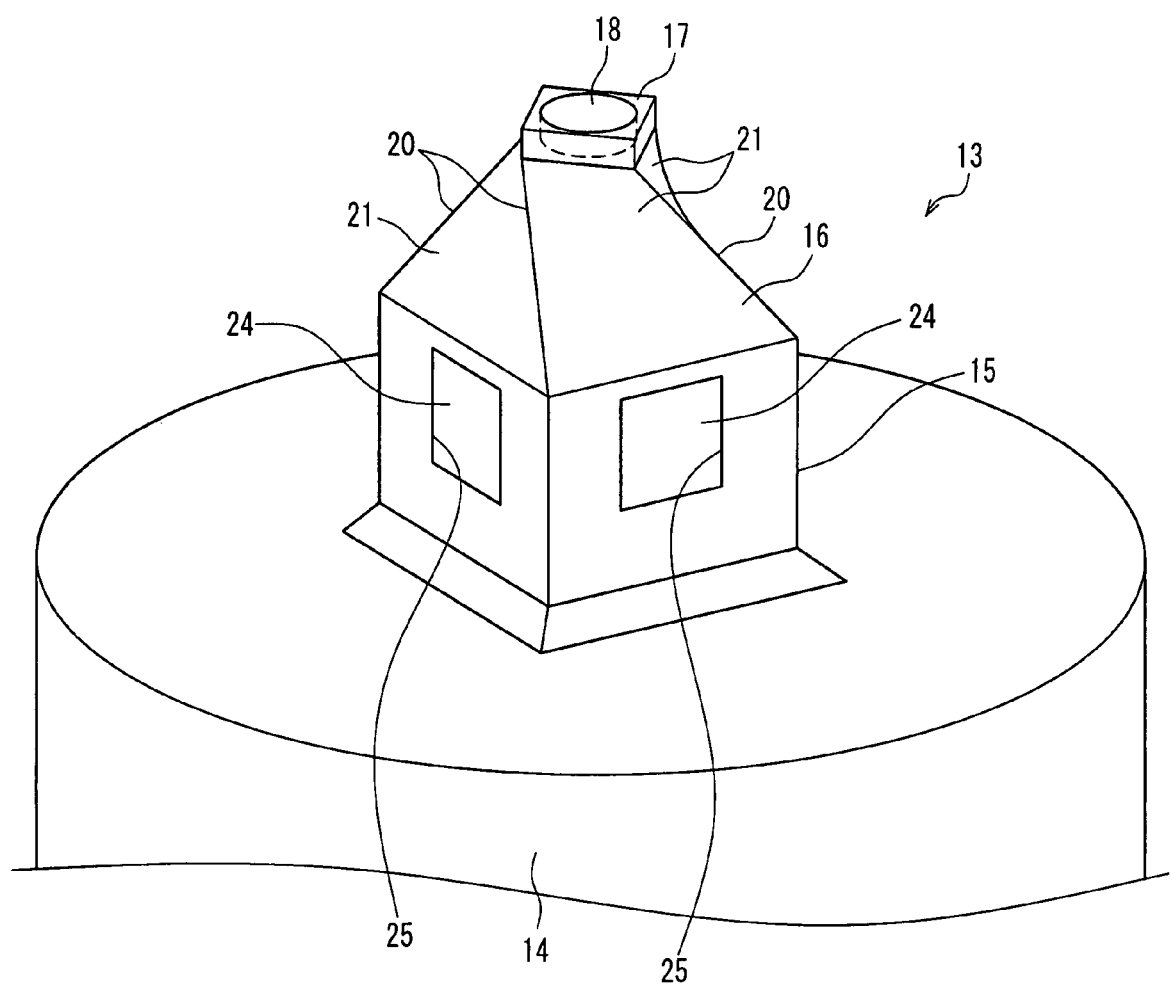
FIG. 3 is a perspective view of a drive shaft.

The drive shaft 13, for rotationally driving the tape reel 2, is provided in the tape drive. As shown in FIG. 3, the drive shaft 13 is configured of a cylindrical shaft body 14; a fitting shaft 15 projecting from the center of the upper face of the shaft body 14; a four-sided pyramid-shaped engagement guide shaft 16 that extends from the top end of the fitting shaft 15; and a magnet 18 embedded in a fixed state into a raised portion 17 provided on the shaft end part of the engagement guide shaft 16. The vertical depth of the reel hole 9 mentioned earlier is set at a dimension sufficient to accept the fitting shaft 15, engagement guide shaft 16, and raised portion 17. The fitting shaft 15 is formed in a four-sided cross-section shape, in the same manner as the reel hole 9; however, the dimensions of the spacing between facing sides of the fitting shaft 15 are slightly smaller than the dimensions of the spacing between facing sides of the reel hole 9.

So that operations for engaging the fitting shaft 15 with the reel hole 9 can be carried out smoothly, the shaft cross-section of the engagement guide shaft 16 is analogous to the cross-section of the fitting shaft 15, and the entirety of the shaft area is formed so as to be upwardly tapered. Furthermore, the entirety of the engagement guide shaft 16 is twisted in a single direction around the center axis of the drive shaft 13. Four ridge lines 20 of the engagement guide shaft 16 connect the ridge lines of the upper end of the fitting shaft 15 with the ridge lines of the lower end of the raised portion 17 across the minimum distance, and shaft surfaces 21 sandwiched by adjacent ridge lines 20 are formed of three-dimensional planes running in the direction in which the engagement guide shaft 16 twists.

As described earlier, the external dimensions of the fitting shaft 15 are formed so as to be slightly smaller than the internal dimensions of the reel hole 9. The dimensions are smaller by the amount of clearance provided between the fitting shaft 15 and the reel hole 9. For this reason, in a state in which the fitting shaft 15 is fitted within the reel hole 9, there is the possibility that the center of the tape reel 2 will be offset from the center of the drive shaft 13 in the radial direction by the amount of clearance between 9 and 15. In order to prevent such offset of the tape reel 2, four aligners 24, and an operation mechanism for extending and retracting the aligners 24, are provided within the drive shaft 13.

The aligners 24 are configured of quadrangular metal blocks, and are supported/guided by guide holes 25 formed in the fitting shaft 15 so as to slide the aligners 24, thereby extending and retracting the aligners 24. To be more specific, the aligners 24 slide back and forth between a standby position, in which the external faces of the aligners 24 are flush with the openings of the guide holes 25 (the state shown in FIG. 3), and an operative position, in which part of each aligner 24 extends outside of the surface of the guide holes 25 and the surfaces of the aligners 24 come into tight contact with the internal surfaces of the reel hole 9 (the state shown in FIG. 1).

While not shown in the diagrams, the operation mechanism is configured of, for example, springs that bias the aligners 24 back toward the standby position direction, and a cam shaft that push the aligners 24 out of the shaft surface against the springs. In the state where the drive shaft 13 is fitted into the reel hole 9, the four aligners 24 are simultaneously pushed out of the shaft surface by the cam shaft mentioned earlier being pushed upward, and the external surfaces of the aligners 24 come into tight contact with the internal surfaces of the reel hole 9, and it is thereby possible to correctly match the centers of the tape reel 2 and the drive shaft 13. The aligners 24 are returned to the standby position by the operation mechanism prior to the tape cartridge being ejected.

Figure 4:
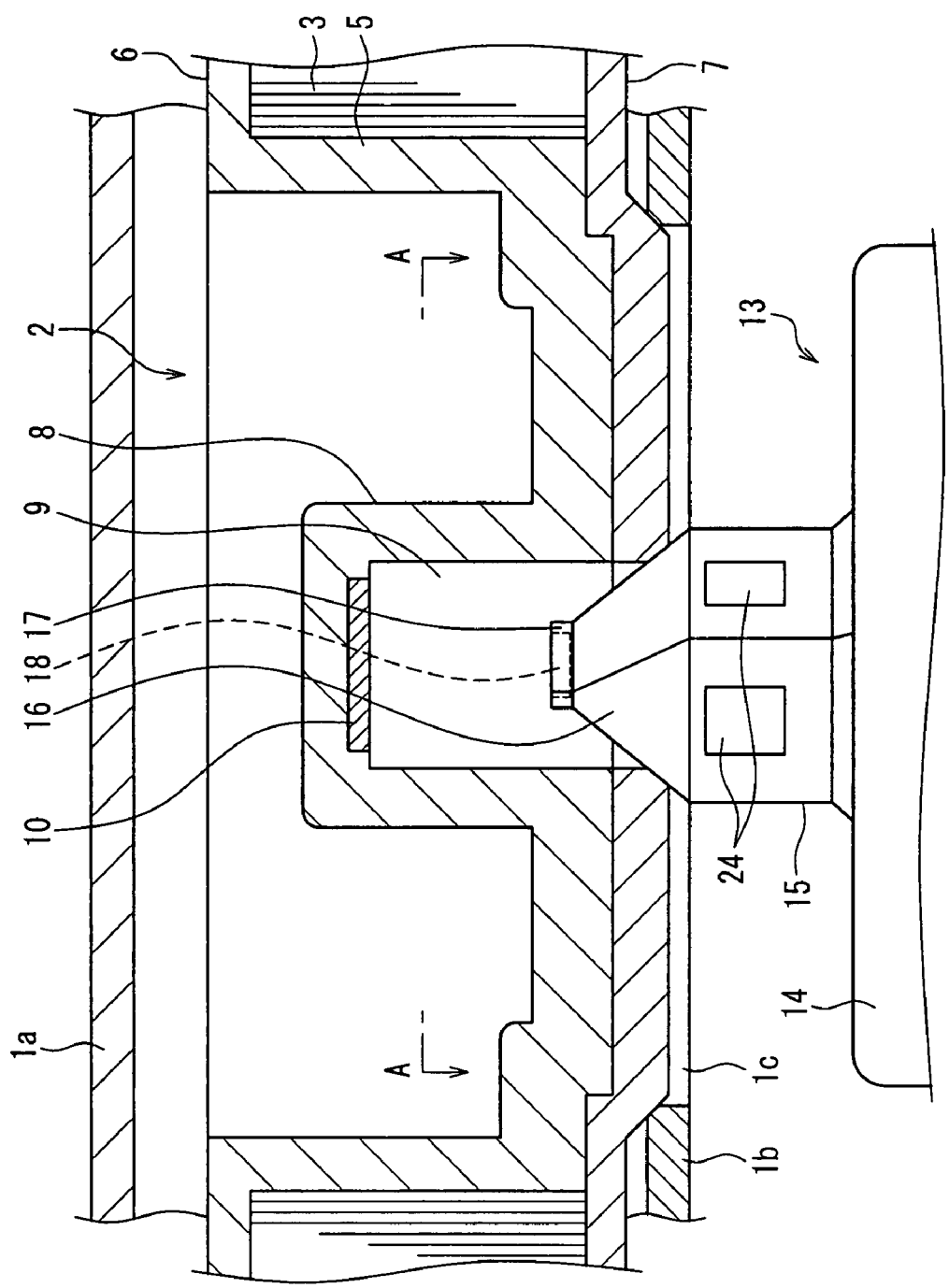
FIG. 4 is a cross-sectional view illustrating a state in which a drive shaft and a reel hole are in the process of coupling.
Figure 5:
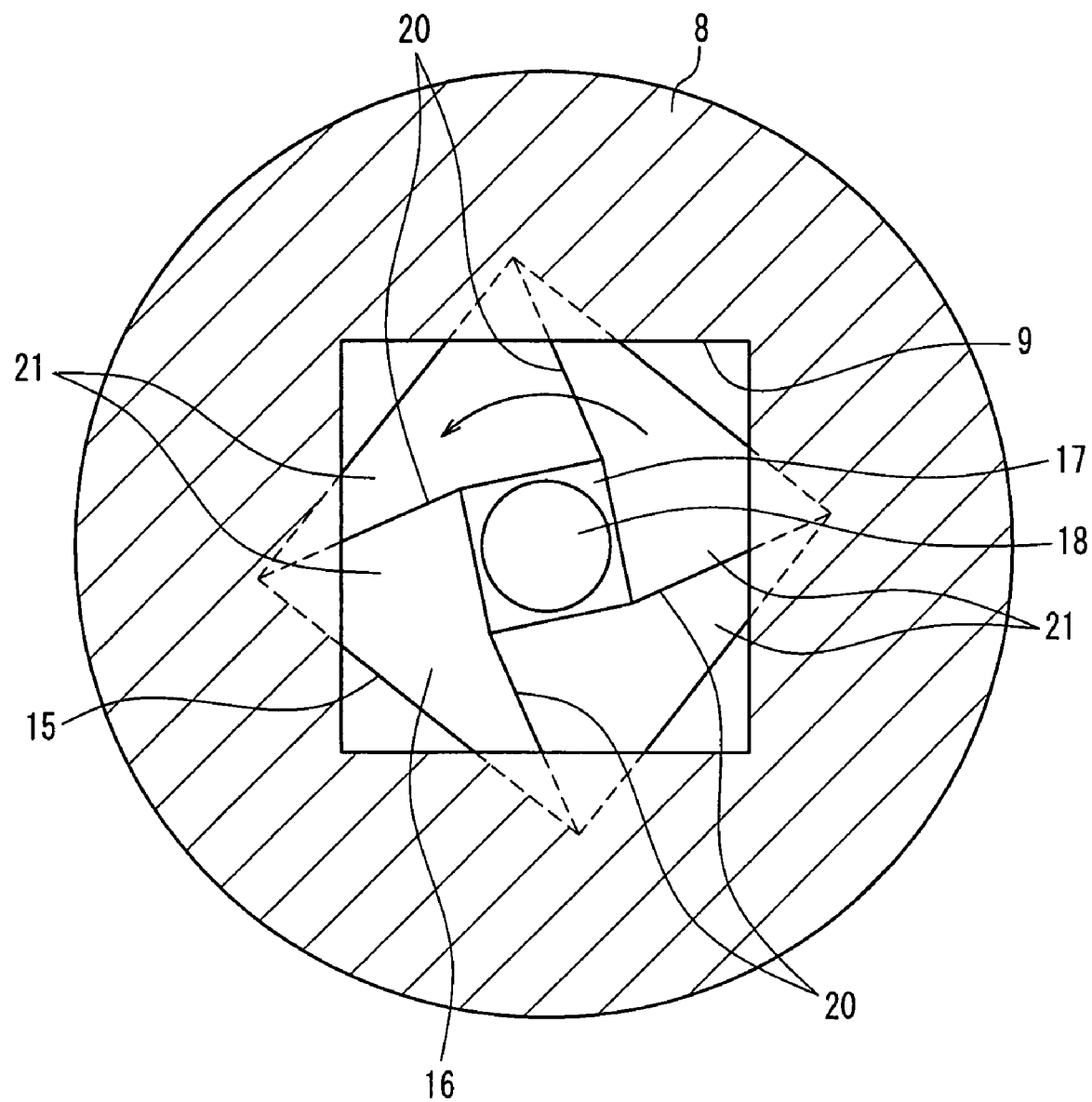
FIG. 5 is a cross-sectional view as viewed along the A-A lines indicated in FIG. 4.

When a tape cartridge is loaded into the tape drive, the drive shaft 13 elevates from a standby position and engages with the reel hole 9 via the drive shaft insertion hole 1c. At this time, in many cases, the bottom opening of the reel hole 9 is first contacted by the ridge lines 20 of the engagement guide shaft 16, as shown in FIGS. 4 and 5. However, by rotating the drive shaft 13 while moving the drive shaft 13 upward, the ridge lines of the fitting shaft 15 and the inner ridge lines of the reel hole 9 match by the time the drive shaft 13 has rotated a maximum of 90 degrees, and therefore it is possible to smoothly engage the fitting shaft 15, which has a four-sided cross-section shape, with the reel hole 9, which also has a four-sided cross-section shape. In addition, even if the centers of the reel hole 9 and the drive shaft 13 are offset, the offset of the tape reel 2 is corrected by the ridge lines 20 of the engagement guide shaft 16, which twists in an upward direction. The centers of the reel hole 9 and the drive shaft 13 can thereby be caused to match, and thus the fitting shaft 15 can be caused to engage with the reel hole 9 in a smooth manner.

The drive shaft 13, which has entered the reel hole 9, is pushed further upward even after the magnet 18 on the top end of the shaft has adhered to the adhesive plate 10; the locked state of the reel locking mechanism is disengaged through this elevating operation. At this time, the center of the tape reel 2 and the center of the drive shaft 13 do not necessarily match; however, by extending the aligners 24 by the operation mechanism, the external faces of the aligners 24 are caused to make tight contact with the internal walls of the reel hole 9, thus correcting offset between the centers of the tape reel 2 and the drive shaft 13. At the same time, a tilt in the center axis of the tape reel 2 can be corrected. The adhesive effect between the magnet 18 and the adhesive plate 10 makes it is possible to fix the tape reel 2 in a state in which it cannot lift off of the drive shaft 13, and makes it possible to prevent the tape reel 2 from moving up and down during rotational driving.

According to a tape cartridge and tape reel driving structure configured as described thus far, an operation for engaging the reel hole 9 of the tape reel 2 with a the drive shaft 13 can be carried out smoothly while causing the centers of the reel hole 9 and the drive shaft 13 to match properly; therefore, reading/writing of a signal from/to recording tape 3 can consistently be carried out in a stable manner, and furthermore, the recording tape 3 can consistently be taken up in the tape reel 2 without miswinds, whereby marring of the tape edge is eliminated. Furthermore, no operational delay arises when the tape reel 2 is repeatedly driven and stopped. In addition, because a recorded signal can consistently be read from/written to the recording tape in a stable manner, it is possible to provide a tape cartridge, a tape reel driving structure, and a tape drive suited to a tape system in which the recording density of the recording tape is high and the recorded signal is read/written at high speed.

Figure 6:
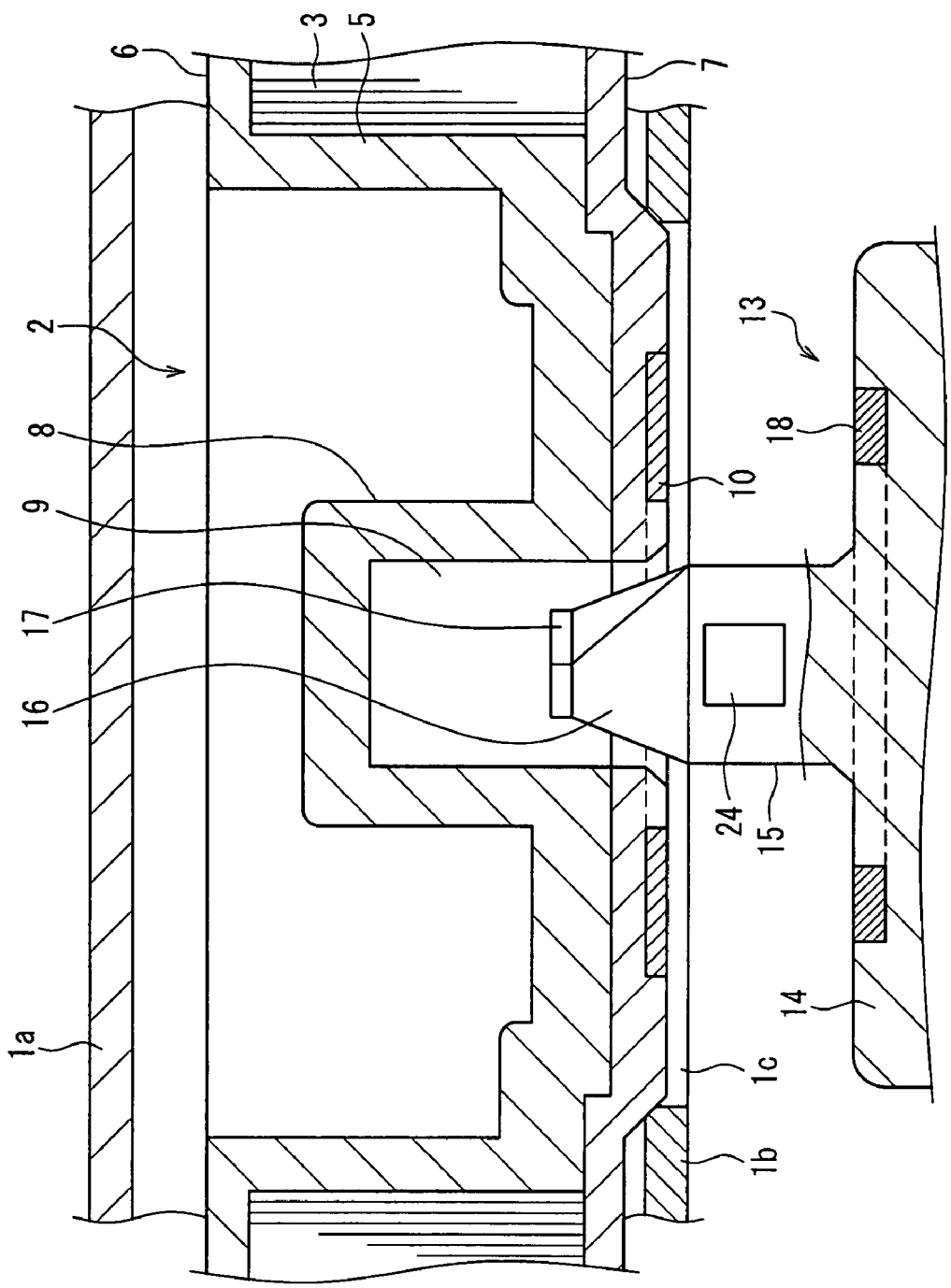
FIG. 6 is a cross-sectional view showing another working example of a driving structure of a tape reel.

In the above working example, the magnet 18 is disposed on the upper end of the drive shaft 13, and the adhesive plate 10 is disposed on the inner end of the reel hole 9; however, such a configuration is not requisite. For example, as shown in FIG. 6, the magnet 18 may be embedded in the top surface of the shaft body 14 of the drive shaft 13, and the adhesive plate 10 may be embedded in the bottom wall of the tape reel 2, in a position vertically opposed to the magnet 18. Note that the rest of the configuration shown in FIG. 6 is identical to the abovementioned working example; therefore, identical constituent elements are given identical reference numerals, and descriptions thereof shall be omitted.

As described above, the magnet 18 and the adhesive plate 10 may be provided in any position on the vertically opposed surfaces of the tape reel 2 and the drive shaft 13 that couple with one another. In addition, the magnet 18 may be provided on the tape reel 2 side, while the adhesive plate 10 may be provided on the drive shaft 13 side. While it is preferable for the magnet 18 and the adhesive plate 10 to be in a continuous ring form, either or both may be disposed in a non-continuous ring form as necessary.

The cross-section shape of the reel hole 9 and the fitting shaft 15 may be a different polygon than that described in the above working example, such as a triangle, a pentagon, or the like. The ridge lines 20 of the engagement guide shaft 16 may be formed in an upwardly tapered spiral shape. It is preferable for the engagement guide shaft 16 to be twisted in a single direction, but such a configuration is not requisite, and the engagement guide shaft 16 may be formed in a simple upwardly tapered shape. The reel hole 9 and the fitting shaft 15 do not necessarily have to be analogous shapes; for example, the reel hole 9 can octagonal, and the fitting shaft 15 can be quadrangular.

In addition to a single-reel type tape cartridge, the present invention can be applied in a tape cartridge of a type in which tape reels are provided on right and left sides within a housing.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A tape cartridge applicable in a tape drive, the tape drive having a drive shaft comprising a fitting shaft formed in a multi-sided cross-section shape and an engagement guide shaft formed in an upwardly tapered shape continuing on top of the fitting shaft,
   wherein a drive shaft insertion hole for the drive shaft is provided on a bottom wall of a housing;
   a reel hole into which the drive shaft is fitted and which inherits rotational force therefrom is formed in a hub of a tape reel contained within the housing in a state facing the drive shaft insertion hole; and
   the reel hole is formed in the same multi-sided cross-section shape as the fitting shaft, and a vertical depth of the reel hole being set so as to accept the fitting shaft and the engagement guide shaft; and
   wherein the engagement guide shaft and the fitting shaft are formed so that their respective cross-sections are of an analogous shape, and the engagement guide shaft is formed so that over its entirety it forms a twisted shape central to the drive shaft.

2. The tape cartridge according to claim 1, wherein a magnet is provided on one surface of a vertical coupling interface between the tape reel and the drive shaft, and an iron-based adhesive plate is provided on the other surface of the vertical coupling interface between the tape reel and the drive shaft.

3. A tape reel driving structure that rotationally drives a tape reel contained within a housing by a drive shaft of a tape drive,
   wherein a reel hole into which the drive shaft is fitted is formed in a hub of the tape reel in a state facing a drive shaft insertion hole, the drive shaft insertion hole being provided in a lower wall of the housing;
   the drive shaft comprises a fitting shaft formed in a multi-sided cross-section shape and an engagement guide shaft formed in an upwardly tapered shape continuing on top of the fitting shaft; and
   the reel hole is formed in the same multi-sided cross-section shape as the fitting shaft, and a vertical depth of the reel hole being set so as to accept the fitting shaft and the engagement guide shaft; and
   wherein the engagement guide shaft and the fitting shaft are formed so that their respective cross-sections are of an analogous shape, and the engagement guide shaft is formed so that over its entirety it forms a twisted shape central to the drive shaft.

4. The tape reel driving structure according to claim 3, wherein a magnet is provided on one surface of a vertical coupling interface between the tape reel and the drive shaft, and an iron-based adhesive plate is provided on the other surface of the vertical coupling interface between the tape reel and the drive shaft.

5. A tape reel driving structure that rotationally drives a tape reel contained within a housing by a drive shaft of a tape drive,
   wherein a reel hole into which the drive shaft is fitted is formed in a hub of the tape reel in a state facing a drive shaft insertion hole, the drive shaft insertion hole being provided in a lower wall of the housing;
   the drive shaft comprises a fitting shaft formed in a multi-sided cross-section shape and an engagement guide shaft formed in an upwardly tapered shape continuing on top of the fitting shaft;
   the reel hole is formed in the same multi-sided cross-section shape as the fitting shaft, and a vertical depth of the reel hole being set so as to accept the fitting shaft and the engagement guide shaft;
   wherein plural aligners are disposed within the drive shaft, the aligners absorbing clearance between the drive shaft and the reel hole;
   the aligners are supported by the drive shaft so as to be positionally changeable between a standby position, in which the aligners retract inwardly into the drive shaft, and an operative position, in which the aligners extend outwardly beyond the outer surface of the drive shaft and come into tight contact with the inner surface of the reel hole; and
   an operating mechanism for switching the aligners between the standby position and the operative position is provided in the drive shaft.

6. A tape drive comprising a drive shaft for rotationally driving a tape reel contained within a housing,
   wherein a multi-sided cross-section shape reel hole is formed in a hub of the tape reel in a state facing a drive shaft insertion hole, the drive shaft insertion hole being provided in a lower wall of the housing;
   the drive shaft comprises a fitting shaft formed in a multi-sided cross-section shape and an engagement guide shaft formed in an upwardly tapered shape continuing on top of the fitting shaft, the fitting shaft and engagement guide shaft fitting inside the reel hole; and
   wherein the engagement guide shaft and the fitting shaft are formed so that their respective cross-sections are of an analogous shape, and the engagement guide shaft is formed so that over its entirety it forms a twisted shape central to the drive shaft.

7. The tape drive according to claim 6, wherein plural aligners are disposed within the drive shaft, the aligners absorbing clearance between the drive shaft and the reel hole;
   the aligners are supported by the drive shaft so as to be positionally changeable between a standby position, in which the aligners retract inwardly into the drive shaft, and an operative position, in which the aligners extend outwardly beyond the outer surface of the drive shaft and come into tight contact with the inner surface of the reel hole; and
   an operating mechanism for switching the aligners between the standby position and the operative position is provided in the drive shaft.

8. The tape drive according to claim 6, wherein a magnet is provided on one surface of a vertical coupling interface between the tape reel and the drive shaft, and an iron-based adhesive plate is provided on the other surface of the vertical coupling interface between the tape reel and the drive shaft.

* * * * *